Figure 5:
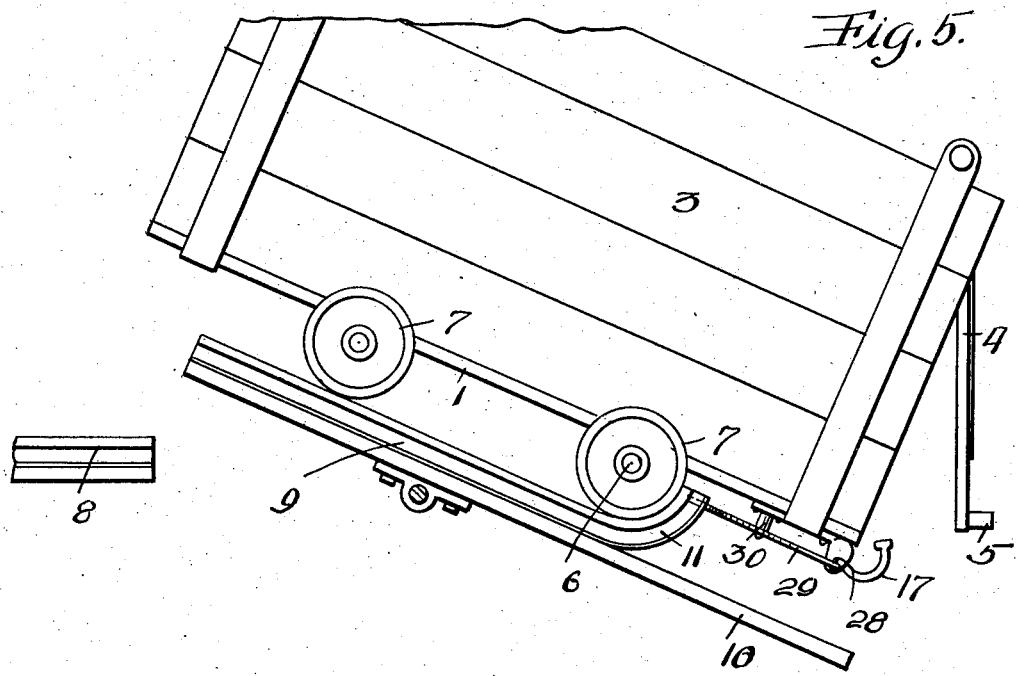

I. DUCSAY.
LOCK.
APPLICATION FILED SEPT. 28, 1911.
1,027,325.
Patented May 21, 1912.
2 SHEETS—SHEET 1.
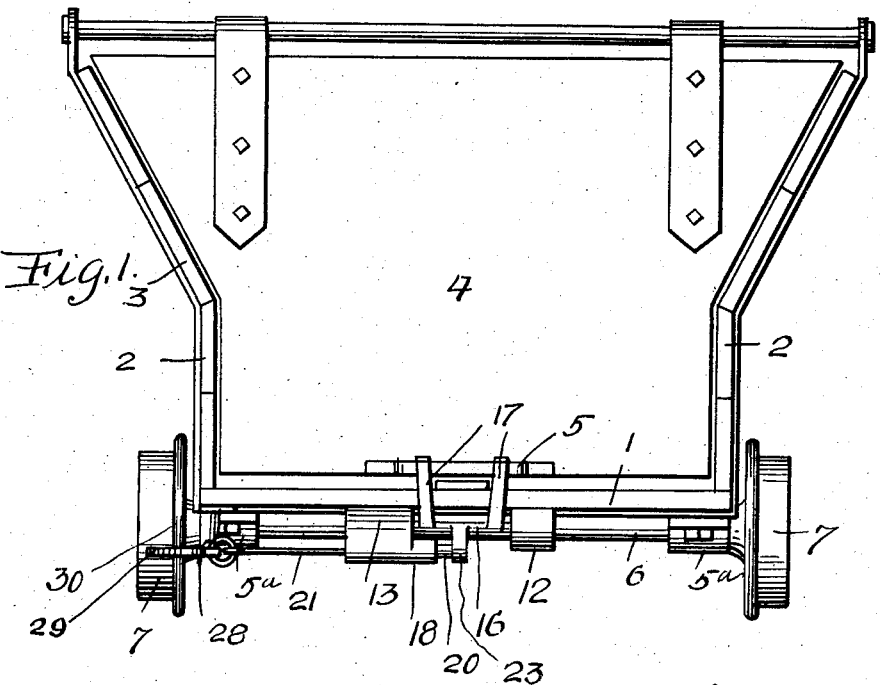
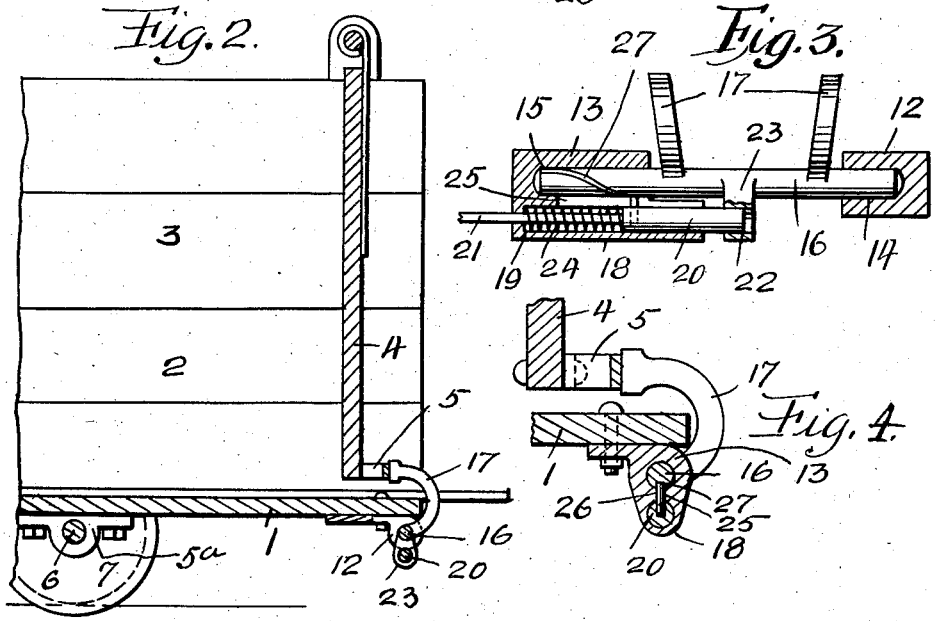
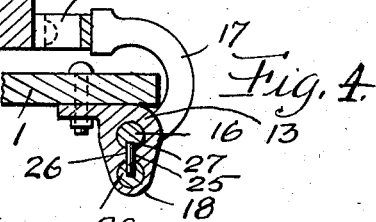
WITNESSES:
Samuel Payne
Ralph C. Evert.
INVENTOR.
I. Ducsay
BY
ATTORNEYS

I. DUCSAY.
LOCK.
APPLICATION FILED SEPT. 28, 1911.

1,027,325.

Patented May 21, 1912.
2 SHEETS—SHEET 2.

WITNESSES:
Samuel Payne
Ralph C. Evert

INVENTOR.
I. Ducsay
BY
ATTORNEYS.

UNITED STATES PATENT OFFICE.

ISTVAN DUCSAY, OF CANONSBURG, PENNSYLVANIA.

LOCK.

1,027,325.  Specification of Letters Patent.  Patented May 21, 1912.

Application filed September 28, 1911. Serial No. 651,687.

*To all whom it may concern:*

Be it known that I, ISTVAN DUCSAY, a subject of the King of Hungary, citizen of the United States of America, residing at Canonsburg, in the county of Washington and State of Pennsylvania, have invented certain new and useful Improvements in Locks, of which the following is a specification, reference being had therein to the accompanying drawing.

This invention relates to locks for the doors of pit cars and that type of car used in mines, quarries, and in connection with the tipples of industrial railways.

The primary object of my invention is to provide a novel lock for retaining the suspended door of a pit car in a closed position, the lock consisting of strong and durable parts that are applicable to various types of mine cars.

A further object of this invention is to provide a lock that can be easily and quickly actuated to release a car door, the locking mechanism remaining in a locked position but receding to permit of the door or gate of a car swinging to a closed position.

With the above and other objects in view, the invention resides in the novel construction, combination, and arrangement of parts to be hereinafter specifically described and then claimed.

Reference will now be had to the drawing, wherein like numerals denote corresponding parts throughout the several views, in which:—

Figure 6:
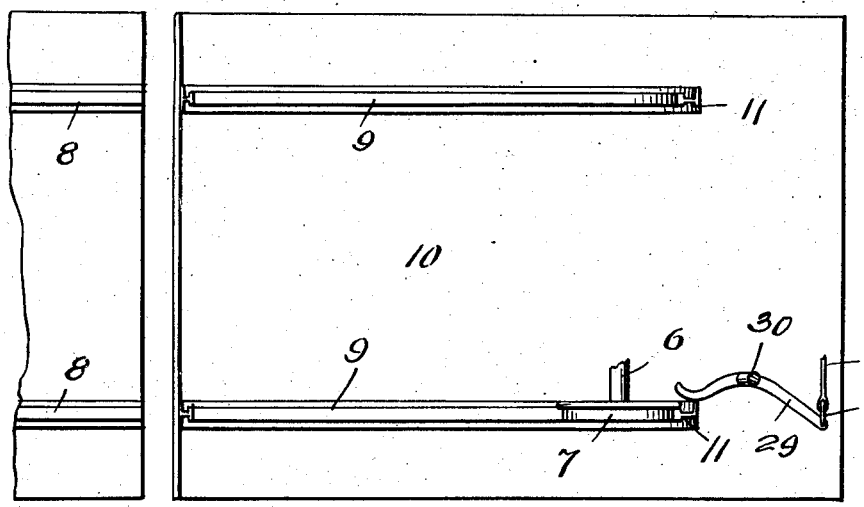

Figure 1 is a rear elevation of a car provided with a lock; Fig. 2 is a longitudinal sectional view of a portion of the car; Fig. 3 is a longitudinal sectional view of a portion of the lock; Fig. 4 is a cross sectional view of a portion of the same; Fig. 5 is a side elevation of a tipple provided with means for actuating the lock; and Fig. 6 is a plan of the same.

The reference numeral 1 denotes the bottom of a car having side walls 2 and 3 and a pivoted or suspended door or gate 4, the lower outer edge of which is provided with a strap 5. The bottom of the car has bearings or journal boxes 5$^a$ for a revoluble axle 6 having wheels 7. The car is adapted to travel upon rails 8 and 9, the latter being carried by a tiltable platform 10 of a tipple. The outer ends of the rails are bent upwardly as at 11 to hold the wheels 7 of the car stationary upon the rails 9 when the platform 10 is tilted to discharge the contents thereof. The bottom of the car is provided with bearings 12 and 13, having sockets 14 and 15 formed therein for the ends of a rock shaft 16, said shaft having upwardly curved crank arms adapted to engage the strap 5 and retain the door or gate 4 in a closed position. The bearing 13 has a depending enlargement 18 provided with a bore 19 for a bolt 20. The bolt 20 has one end thereof provided with a stem 21 extending out of the end of the enlargement 18, and the opposite end of the bolt is adapted to extend into an opening 22 provided therefor in a crank arm 23 carried by the rock shaft 16. The bolt 20 is normally retained in the crank 23 by a coiled compression spring 24 encircling the stem 21 within the bore 19. The bore is in communication with the socket 15 through the medium of a longitudinal slot 25 provided therefor in the enlargement 18, and extending through said slot is a pin 26 having the lower end thereof mounted in the inner end of the bolt 20. The upper end of the pin 26 extends into a spirally arranged groove 27 provided therefor in the bolt 16, and said pin is adapted to ride into said groove when the bolt 20 is moved longitudinally of the bore 19.

The outer end of the stem 21 is loosely connected, as at 28, to a curved horizontal lever 29 pivotally mounted on a depending pin 30, carried by the bottom 1 of the car adjacent to the side wall 3 thereof. The outer side of the lever 29 is beveled or curved and is engaged by the curved end of one of the rails 9 to move the stem 21.

When the car passes on to the tiltable platform 10, the inner end of the lever 29 rides into engagement with one of the rails 9 which causes the outer end of the lever to move outwardly in respect to the car, thereby pulling outwardly upon the stem 21. As the stem 21 is moved outwardly, the bolt 20 is moved in the bore 19, releasing the crank 23 of the rock shaft 16. The pin 26 rides in the spiral groove 27 and immediately upon the crank being released the pin 26 starts to rotate or rock shaft 16, and the arms 17 are swung outwardly and downwardly thereby releasing the lower edge of the door or gate 4. When the platform 10 is tilted, the door or gate 4 swings open to discharge the contents of the car, and immediately upon the platform 10 being swung to a horizontal position, the door or gate 4 closes; then when the car is moved off of the platform 10, the lever 29 is released and the spring 24 restores the rock shaft 16 to its normal position with the arms 17 in engagement with the strap 5 and the bolt 20 to its normal position in engagement with the crank 23. The rock shaft 16 is locked until the lever 29 is again actuated, and the door or gate 4 cannot accidentally open when the car is loaded. It is apparent from the foregoing that I have devised a normally closed lock adapted to be automatically actuated to release the door or gate of the car when the car is to be emptied.

What I claim is:

1. In a lock for the lower edge of a door or gate, a rock shaft, arms carried thereby and adapted to lock the lower edge of the door or gate, a bolt adapted to be moved actuating said rock shaft, a lever adapted to move said bolt, means in the path of said lever and adapted to actuate said lever.

2. In a lock, the combination with a car having a door or gate, a rock shaft supported from the bottom of said car, arms carried thereby and adapted to lock the lower edge of the door or gate, means including a lever and a bolt adapted to actuate said rock shaft, and means within the path of said lever and adapted to actuate said lever.

3. In a lock, the combination with a car having a door or gate, of a rock shaft supported from the bottom of said car, arms carried thereby and adapted to lock the lower edge of the door or gate, a bolt normally locking said rock shaft and adapted to be shifted to release said rock shaft and actuate the same, and means including a lever adapted to automatically shift said bolt.

4. In a lock, the combination with a car having a door or gate, of a rock shaft provided with arms adapted to lock the lower edge of the door or gate, and an automatically actuated bolt adapted to normally lock said rock shaft against said movement, and when actuated, to release said rock shaft and rock the same.

5. In a lock, the combination with a car having a door or gate, of a spirally grooved rock shaft supported from the bottom of said car and provided with arms adapted to normally lock the lower edge of a door or gate, a spring pressed bolt adjacent to said rock shaft and adapted to normally lock said shaft against movement, a pin carried by said bolt and extending into the groove of said rock shaft and adapted to rock said shaft when said bolt releases the same, and means including a lever adapted to automatically move said bolt.

In testimony whereof I affix my signature in the presence of two witnesses.

ISTVAN DUCSAY.

Witnesses:
B. FRITCCZ,
W. J. GOWERN.

---

Copies of this patent may be obtained for five cents each, by addressing the "Commissioner of Patents, Washington, D. C."